United States Patent
Aoki et al.

(10) Patent No.: US 9,108,526 B2
(45) Date of Patent: Aug. 18, 2015

(54) HYBRID VEHICLE

(71) Applicants:Kazuma Aoki, Toyota (JP); Koji Hokoi, Toyota (JP); Hiroki Endo, Nissin (JP)

(72) Inventors: Kazuma Aoki, Toyota (JP); Koji Hokoi, Toyota (JP); Hiroki Endo, Nissin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/244,294

(22) Filed: Apr. 3, 2014

(65) Prior Publication Data

US 2014/0303819 A1    Oct. 9, 2014

(30) Foreign Application Priority Data

Apr. 8, 2013 (JP) ................................. 2013-080416

(51) Int. Cl.
*B60L 11/18* (2006.01)
*B60W 20/00* (2006.01)
*B60W 10/06* (2006.01)
*B60W 10/26* (2006.01)

(52) U.S. Cl.
CPC ............ *B60L 11/1861* (2013.01); *B60W 10/06* (2013.01); *B60W 10/26* (2013.01); *B60W 20/00* (2013.01); *B60W 20/106* (2013.01); *B60W 2510/0657* (2013.01); *B60W 2710/244* (2013.01); *Y02T 10/7011* (2013.01); *Y10S 903/903* (2013.01); *Y10S 903/93* (2013.01)

(58) Field of Classification Search
CPC .......... B60W 10/08; B60W 2510/244; B60W 10/26; B60W 2540/12; B60W 20/00; B60W 2540/10; B60W 2540/103; B60W 2550/142; B60L 11/184; B60L 2260/54

USPC .......... 701/400–541; 340/988–996; 903/903, 903/930

See application file for complete search history.

(56) References Cited

U.S. PATENT DOCUMENTS

| 2002/0142884 A1* | 10/2002 | Kitajima et al. ................... 477/2 |
| 2009/0230908 A1* | 9/2009 | Soma et al. ................... 318/452 |
| 2010/0030416 A1 | 2/2010 | Jinno |

FOREIGN PATENT DOCUMENTS

| JP | 2003-235108 A |   | 8/2003 |
| JP | 2008-168860 A |   | 7/2008 |
| JP | 2011-093335   | * | 5/2011 |
| JP | 2011-093335 A |   | 5/2011 |
| JP | 2012-046121 A |   | 3/2012 |
| JP | 2012-075282   | * | 4/2012 |

* cited by examiner

*Primary Examiner* — Muhammad Shafi
(74) *Attorney, Agent, or Firm* — Kenyon & Kenyon LLP

(57) ABSTRACT

A hybrid vehicle includes a power storage device, an engine, a power generation apparatus, an input apparatus, and an ECU. The power generation apparatus is configured to generate charging power of the power storage device by using output of the engine. The input apparatus is configured to request, by a user input, an increase in a power storage amount of the power storage device. The ECU is configured to: (a) control charging of the power storage device by the power generation apparatus and accelerate the charging of the power storage device, when the increase in the power storage amount is requested, and (b) suppress charging of the power storage device at the time when a travel load is small in comparison with charging of the power storage device at the time when the travel load is large, when the increase in the power storage amount is requested.

13 Claims, 9 Drawing Sheets

HYBRID VEHICLE

INCORPORATION BY REFERENCE

The disclosure of Japanese Patent Application No. 2013-080416 filed on Apr. 8, 2013 including the specification, drawings and abstract is incorporated herein by reference in its entirety.

BACKGROUND OF THE INVENTION

1. Field of the Invention

This invention relates to a hybrid vehicle.

2. Description of Related Art

Japanese Patent Application Publication No. 2011-93335 (JP 2011-93335 A) discloses a hybrid vehicle (HV) that is mounted with a generator capable of generating the charging power of a power storage device by using the output of an internal combustion engine. In the hybrid vehicle, when a charging request for increasing the power storage amount of the power storage device from a user is detected, the output of the internal combustion engine is increased compared to the output at the time of non-detection of the charging request such that the charging of the power storage device is accelerated.

According to this hybrid vehicle, it is possible to implement the charging/discharging management of the power storage device corresponding to the intension of a user, e.g., an increase in a power storage amount in advance in preparation for electric vehicle (EV) traveling (traveling using only an electric motor while the internal combustion engine is stopped) or the selection of a power mode, in addition to conventional charging/discharging control, in which the power storage amount of the power storage device is maintained at a target value (see JP 2011-93335 A).

SUMMARY OF THE INVENTION

When the power storage amount of a power storage device is increased, the power storage amount may be desired to be increased as fast as possible, or may be desired to be increased as efficiently as possible. Additionally, there may be a possibility that noise or vibration (NV) generated by an internal combustion engine at the time of the activation of the internal combustion engine for power generation is concerned. That is, there is a possibility that the deterioration of noise and vibration (NV) properties is concerned. In the technologies disclosed in the aforementioned JP 2011-93335 A, and Japanese Patent Application Publication No. 2012-46121 (JP 2012-46121 A), a study on these viewpoints is not conducted.

This invention provides a HV capable to improve efficiency or NV properties in a case of increasing the power storage amount of a power storage device in response to a request of a user.

A first aspect of the invention includes a hybrid vehicle including a power storage device, an internal combustion engine, a power generation apparatus, an input apparatus, and an electronic control unit. The power generation apparatus is configured to generate charging power of the power storage device by using output of the internal combustion engine. The input apparatus is configured to request, by a user input, an increase in a power storage amount of the power storage device. The electronic control unit is configured to control charging of the power storage device by the power generation apparatus and accelerate the charging of the power storage device, when the increase in the power storage amount is requested, and the electronic control unit is configured to suppress charging of the power storage device at the time when a travel load of the internal combustion engine is small in comparison with charging of the power storage device at the time when the travel load of the internal combustion engine is large, when the increase in the power storage amount is requested.

In the hybrid vehicle, the electronic control unit may be configured to increase a period, during which the power generation apparatus is stopped, at the time when the travel load of the internal combustion engine is small in comparison with a period, during which the power generation apparatus is stopped, at the time when the travel load of the internal combustion engine is large, when the increase in the power storage amount is requested.

In the hybrid vehicle, the electronic control unit may be configured to execute control of accelerating the charging of the power storage device by the power generation apparatus, when the increase in the power storage amount is requested, and the electronic control unit may be configured to control switching between a high charge mode of increasing the power storage amount early, and a low charge mode of suppressing the charging of the power storage device by the power generation apparatus at the time when the travel load is small in comparison with the charging of the power storage device by the power generation apparatus at the time when the travel load is large, when the control of accelerating the charging is executed.

In the HV, the electronic control unit may be configured to forcibly perform the charging of the power storage device by the power generation apparatus, when a state amount indicating a charging state of the power storage device deviates from a target of the state amount in a direction in which the state amount is lower than the target, and make the target follow the state amount at the time of the charging of the power storage device by the power generation apparatus such that the state amount does not deviate from the target, when the low charge mode is selected.

In the hybrid vehicle, the electronic control unit may be configured to make the target follow a maximum value of the state amount, when the low charge mode is selected.

In the hybrid vehicle, the electronic control unit may be configured to increase the target such that the state amount deviates from the target, when the high charge mode is selected.

In the hybrid vehicle, the electronic control unit may be configured to make a charge amount of the power storage device by the power generation apparatus constant, regardless of the power storage amount, when the low charge mode is selected.

In the hybrid vehicle, the electronic control unit may be configured to start the internal combustion engine when the travel load is increased, and stops the internal combustion engine when the travel load is reduced, and further perform the charging of the power storage device by the power generation apparatus at the time of actuation of the internal combustion engine according to the travel load, when the low charge mode is selected.

In the hybrid vehicle, the electronic control unit may be configured to perform switching between the high charge mode and the low charge mode on the basis of input from the input apparatus.

In the hybrid vehicle, the electronic control unit may be configured to increase a charging target of the power storage device by the power generation apparatus, when the increase in the power storage amount is requested.

In the hybrid vehicle, the electronic control unit may be configured to control the charging of the power storage device by the power generation apparatus so as to increase a charge rate of the power storage device by the power generation apparatus, when the increase in the power storage amount is requested.

A second aspect of the invention is a control method of a hybrid vehicle. The hybrid vehicle includes a power storage device, an internal combustion engine, a power generation apparatus, and an input apparatus configured to request an increase in a power storage amount of the power storage device by a user input. The control method includes: charging the power storage device by the power generation apparatus and accelerating the charging of the power storage device, when the input apparatus requests the increase in the power storage amount; and suppressing charging of the power storage device at the time when a travel load of the internal combustion engine is small in comparison with charging of the power storage device at the time when the travel load is large, in a state where the input apparatus requests the increase in the power storage amount.

According to this invention, there is provided the input apparatus for allowing the user to request the increase in the power storage amount of the power storage device. When the increase in the power storage amount is requested by the input apparatus, the charging of the power storage device is performed by the power generation apparatus so as to accelerate the charging of the power storage device (charge acceleration control). In the charge acceleration control, the charging of the power storage device at the time when the travel load is small is suppressed in comparison with the charging of the power storage device at the time when the travel load is large. Consequently, the output of the internal combustion engine is also restricted when the travel load is small, and therefore the activation of the internal combustion engine with low efficiency and a low load that results in the deterioration of NV properties is suppressed. Therefore, according to this invention, it is possible to provide a hybrid vehicle capable to improve efficiency or NV properties in a case of increasing the power storage amount of the power storage device in response to a request of a user.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
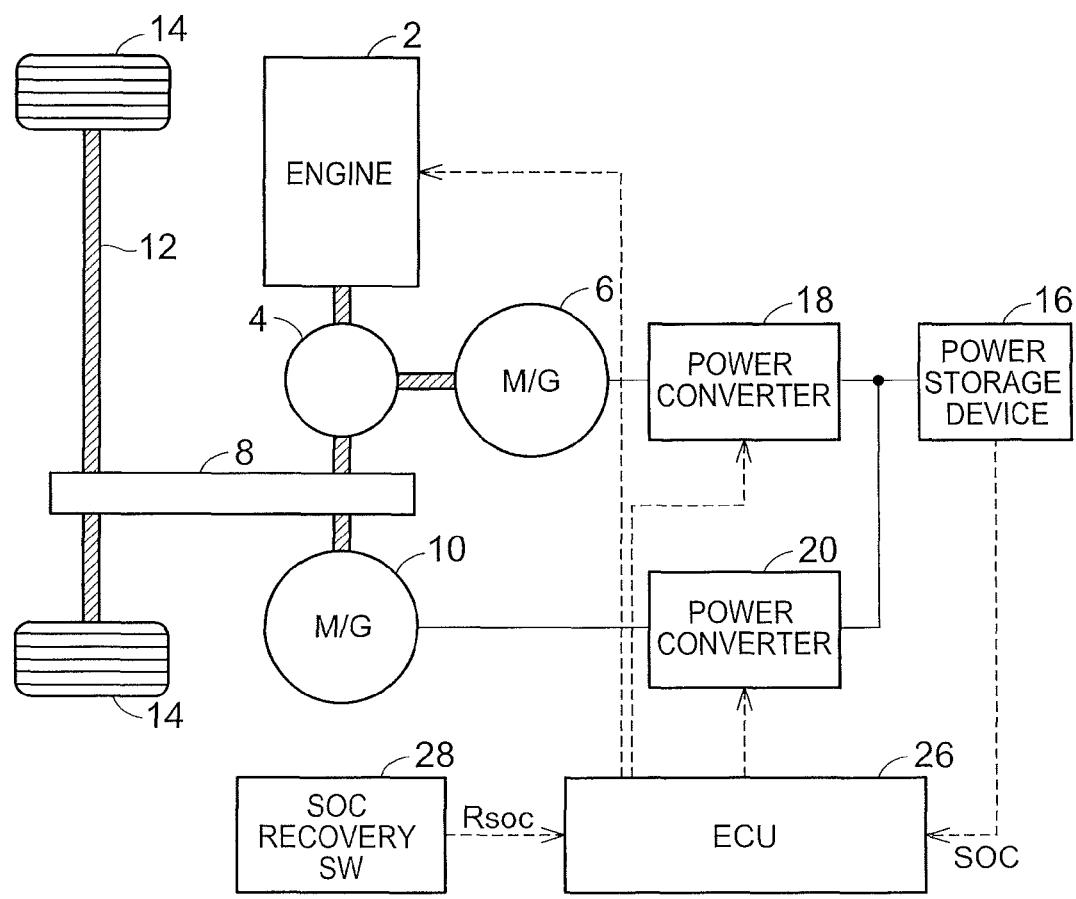
FIG. 1 is a block diagram of the entire system of a hybrid vehicle according to an embodiment of the invention.

Hereinafter, embodiments of the invention will be described in detail with reference to the drawings. Although a plurality of embodiments will be described as follows, configurations described in the respective embodiments may be appropriately combined. The same or corresponding parts are denoted by the same reference numerals, and description of the same or corresponding parts is not repeated.

First, a first embodiment will be hereinafter described. FIG. 1 is a block diagram of a system of a hybrid vehicle according to the embodiment of this invention. With reference to FIG. 1, a hybrid vehicle (HV) 100 includes an engine 2, a power division apparatus 4, motor generators 6 and 10, a transmission gear 8, a driving shaft 12, and wheels 14. The HV 100 further includes a power storage device 16, power converters 18 and 20, an electronic control unit (ECU) 26, and an SOC recovery switch 28.

The power division apparatus 4 is coupled to the engine 2, the motor generator 6, and the transmission gear 8, to distribute power among these. For example, a planetary gear that has three rotary shafts of a sun gear, a planetary carrier, and a ring gear is used as the power division apparatus 4, and the aforementioned three rotary shafts are connected to the respective rotary shafts of motor generator 6, the engine 2, and the transmission gear 8. A rotary shaft of the motor generator 10 is connected to the rotary shaft of the transmission gear 8. That is, the motor generator 10 and the transmission gear 8 have the same rotary shaft, and this rotary shaft is connected to the ring gear of the power division apparatus 4.

Kinetic energy generated by the engine 2 is distributed into the motor generator 6 and the transmission gear 8 by the power division apparatus 4. The engine 2 is incorporated in the HV 100 as a power source that drives the transmission gear 8 which transmits power to the driving shaft 12, and drives the motor generator 6. The motor generator 6 is incorporated in the HV 100 as a component that operates as a generator driven by the engine 2 and operates as an electric motor which enables the start of the engine 2. The motor generator 10 is incorporated in the HV 100 as a power source that drives the transmission gear 8 which transmits power to the driving shaft 12.

The power storage device 16 is a rechargeable direct current (DC) power supply, and is configured by, for example, a secondary battery such as nickel hydride and lithium ion. The power storage device 16 supplies electric power to the power converters 18 and 20. While the motor generators 6 and/or 10 generate electric power, the power storage device 16 is recharged by receiving the power. As the power storage device 16, a large capacity capacitor can be also employed. As long as the power storage device is an electric power buffer capable of temporally storing electric power generated by the motor generators 6 and/or 10, and supplying the stored electric power to the motor generators 6 and/or 10, any apparatus may be employed. The voltage of the power storage device 16 is, for example, about 200 V.

The power storage device 16 calculates a state of charge (hereinafter referred to as a SOC) of the power storage device 16 on the basis of a storage voltage and input and output currents, and outputs the calculated SOC to the ECU 26. The SOC represents a power storage amount with respect to a full charging state of the power storage device 16 by 0 to 100%, and indicates the remaining capacity of the power storage device 16. The voltage and the input and output currents of the power storage device 16 are detected by a voltage sensor and a current sensor, both of which are not shown. The detection values of the voltage and the input and output currents of the power storage device 16 may be output from the power storage device 16 to the ECU 26, and the SOC may be calculated by the ECU 26.

The power converter 18 converts the electric power generated by the motor generator 6 into DC power, to output the converted power to the power storage device 16, on the basis of a control signal received by the ECU 26. The power converter 20 converts DC power supplied from the power storage device 16 into alternate current (AC) power, to output the converted power to the motor generator 10, on the basis of a control signal received by the ECU 26.

The power converter 18 converts DC power supplied from the power storage device 16 into AC power, to output the converted power to the motor generator 6, at the time of starting the engine 2. The power converter 20 converts electric power generated by the motor generator 10 into DC power, to output the converted power to the power storage device 16, at the time of braking the vehicle or at the time of reducing acceleration on a downward slope. The power converters 18 and 20 are configured by inverters. Converters that boost the input voltages of the power converters 18 and 20 to at least the voltage of the power storage device 16 may be provided between the power storage device 16 and the power converter 18 and between the power storage device 16 and the power converter 20.

The motor generators 6 and 10 each are an AC motor, and are configured by, for example, a three-phase AC synchronous motor where a permanent magnetic is buried in a rotor. The motor generator 6 converts kinetic energy generated by the engine 2 into electrical energy, to output the converted electrical energy to the power converter 18. The motor generator 6 generates driving force by three-phase AC power received from the power converter 18, to cause the engine 2 to start.

The motor generator 10 generates the driving torque of the vehicle by three-phase AC power received from the power converter 20. The motor generator 10 converts mechanical energy stored in the vehicle as kinetic energy or potential energy into electrical energy, to output the converted electrical energy to the power converter 20, at the time of braking the vehicle or at the time of reducing acceleration on a downward slope.

The engine 2 converts thermal energy caused by the combustion of fuel into kinetic energy of a moving body such as a piston and a rotor, to output the converted kinetic energy to the power division apparatus 4. For example, in a case where the moving body is a piston, and the motion of the piston is reciprocating motion, the reciprocating motion is converted into rotary motion via a so-called crank mechanism, and kinetic energy of the piston is transmitted to the power division apparatus 4.

The ECU 26 includes a central processing unit (CPU), a memory, an input-output buffer, and the like (all of which are not shown). The ECU 26 inputs various signals from the SOC recovery switch 28, the power storage device 16, and the like, or outputs a control signal to each apparatus, and controls each apparatus in the HV 100. The control is not limited to a process performed by software, and can be a process performed by dedicated hardware (electronic circuit).

When the efficiency of the engine 2 is lowered, the ECU 26 controls the power converter 20 so as to cause the engine 2 to stop to allow traveling only by the motor generator 10 (EV traveling). The example of a case where the efficiency of the engine 2 is lowered includes a case where a travel load is small, such as a vehicle stopping state or low-speed traveling, for example. When a travel load rises, and the engine 2 can be efficiently operated, the ECU 26 controls the engine 2 and the power converters 18 and 20 so as to cause the engine 2 to start to allow traveling using the engine 2 and the motor generator 10 (HV traveling).

When the SOC received from the power storage device 16 becomes lower than a predetermined target, the ECU 26 controls the engine 2 and the power converter 18 such that the power storage device 16 is charged by power generation of the motor generator 6 by using the output of the engine 2. Furthermore, at the time of braking the vehicle or at the time of reducing acceleration on a downward slope, the ECU 26 controls the power converter 20 such that the motor generator 10 performs regenerative power generation.

When the ECU 26 receives a request signal Rsoc from the SOC recovery switch 28 described later, the ECU 26 executes charge control (charge acceleration control) using the engine 2 and the motor generator 6 such that the charging of the power storage device 16 is accelerated. This charge acceleration control is control of making a control target of the SOC higher than a control target in normal time (in non-execution of the charge acceleration control), or control of making a charge rate (charge amount per unit time) of the power storage device 16 higher than a charge rate in normal time, and is different from normal charge control of maintaining the SOC to a fixed control target in HV traveling.

The SOC recovery switch 28 is an input apparatus for allowing the user to request an increase in a power storage amount of the power storage device 16. The user can request the vehicle to increase the power storage amount of the power storage device 16 by operating the SOC recovery switch 28, in preparation for the selection of EV traveling by operating a separately provided EV traveling request switch (not shown), or the selection of power traveling (traveling mode of improving vehicle acceleration with respect to accelerator pedal operation) by operating a separately provided power mode switch (not shown). When the user operates the SOC recovery switch 28, the request signal Rsoc is output from the SOC recovery switch 28 to the ECU 26. In place of the SOC recovery switch 28, increase in the power storage amount can be requested by the user by using voice input means or the like.

The user can select two charge modes by operating the SOC recovery switch 28. One of the two charge modes is a "high charge mode" of increasing the SOC early. When the high charge mode is selected by the SOC recovery switch 28, the ECU 26 controls the engine 2 and the power converter 18 such that the engine 2 is started immediately and the motor generator 6 is activated to forcibly charge the power storage device 16.

The other is a "low charge mode" of suppressing the charging of the power storage device 16 at the time of a small travel load in comparison with the charging of the power storage device 16 at the time of a large travel load. When the SOC recovery switch 28 selects the low charge mode, the ECU 26 controls the engine 2 and the power converter 18 such that the SOC is increased when the engine 2 is activated in accordance with the travel load. This low charge mode is also for increasing the SOC. When the low charge mode is selected, the control target of the SOC or the charge rate of the power storage device 16 is increased compared to the control target or the charge rate in normal SOC control with no request of the increase of the SOC.

Figure 2:
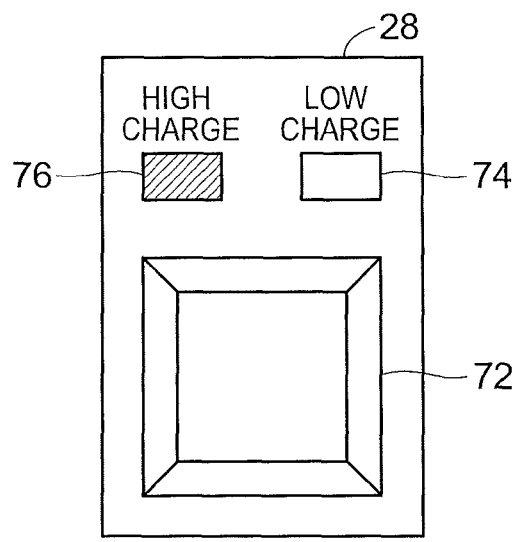
FIG. 2 is a diagram showing an example of the outer shape of a state of charge (SOC) recovery switch.
Figure 3:
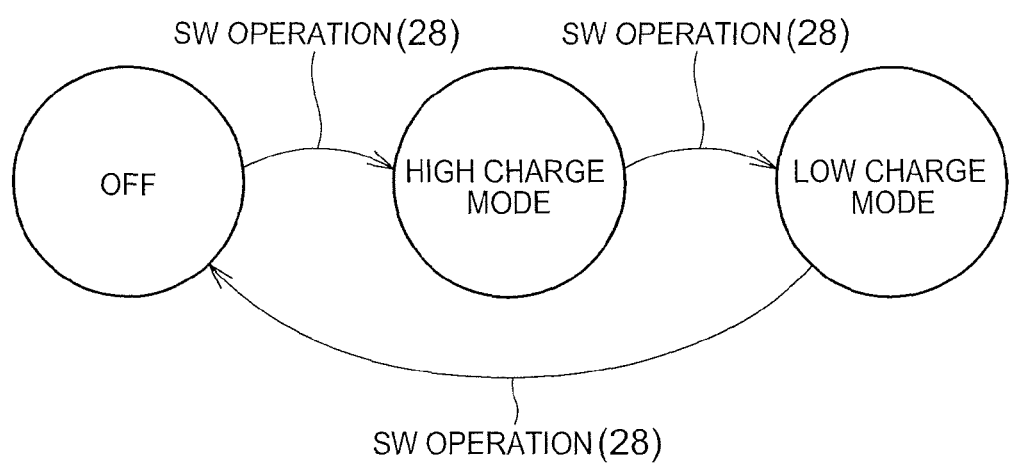
FIG. 3 is a diagram showing mode transition when the SOC recovery switch is operated.

FIG. 2 is a diagram showing an example of the outer shape of the SOC recovery switch. FIG. 3 is a diagram showing mode transition when the SOC recovery switch 28 is operated. With reference to FIGS. 2 and 3, the SOC recovery switch 28 includes an operation unit 72, and display units 74 and 76. Each time the user operates the operation unit 72, the high charge mode, the low charge mode, and an OFF state (non-request state of the increase in the power storage amount) are sequentially switched. The order of the high charge mode and the low charge mode may be changed.

The ECU 26 reports to the SOC recovery switch 28 which one of the high charge mode, the low charge mode, and the OFF state has been selected. Then, when the high charge mode is selected, the display unit 74 is lighted. When the low charge mode is selected, the display unit 76 is lighted.

Referring to FIG. 1 again, when the high charge mode is selected, the ECU 26 activates the engine 2 regardless of the travel load of the vehicle, and executes charge acceleration control of accelerating the charging of the power storage device 16 by charging the power storage device 16 in use of the engine 2 and the motor generator 6. Consequently, it is possible to early recover the power storage amount of the power storage device 16.

When the low charge mode is selected, the ECU 26 executes charge acceleration control of accelerating the charging of the power storage device 16 by charging the power storage device 16 in use of the engine 2 and the motor generator 6 at the time of the activation of the engine 2 according to the travel load. That is, when the low charge mode is selected, but the travel load is small, the ECU 26 controls the power converter 20 such that the engine 2 is stopped and EV traveling is implemented in use of only the motor generator 10. When the travel load is increased, and the engine 2 is started, the ECU 26 executes the aforementioned charge acceleration control by using the engine 2 and the motor generator 6.

In the aforementioned description, various control is executed by the integrated one ECU 26. However, the various control may be executed by individually configured electronic control units such as an ECU for controlling the engine, an ECU for controlling the motor generators 6 and 10 (power converters 18 and 20), and an ECU for monitoring the power storage device 16.

Figure 4:
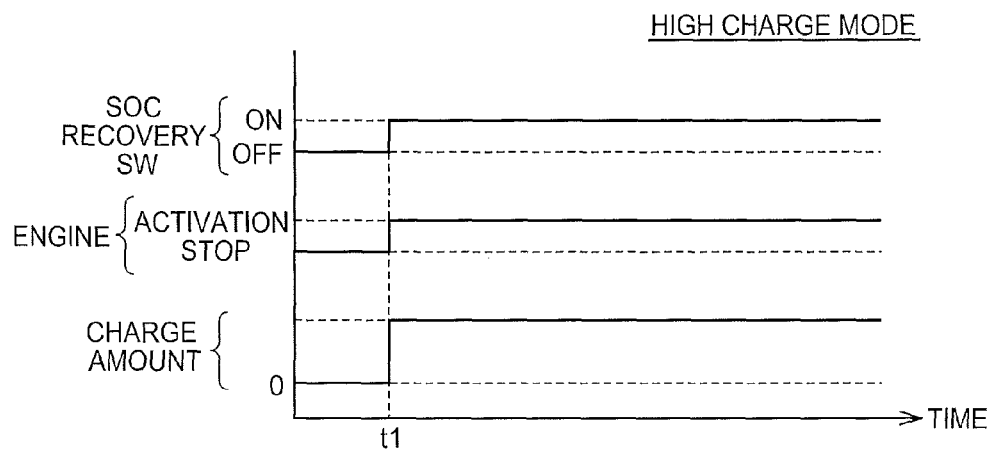
FIG. 4 is a timing chart showing charging operation in a high charge mode.

FIG. 4 is a timing chart showing charging operation in the high charge mode. With reference to FIG. 4, at time t1, when the high charge mode is selected by turning on the SOC recovery switch 28, the engine 2 starts. Then, the motor generator 6 generates power by using the output of the engine 2, the power storage device 16 is charged with a predetermined charge amount such that the charging of the power storage device 16 is accelerated.

Figure 5:
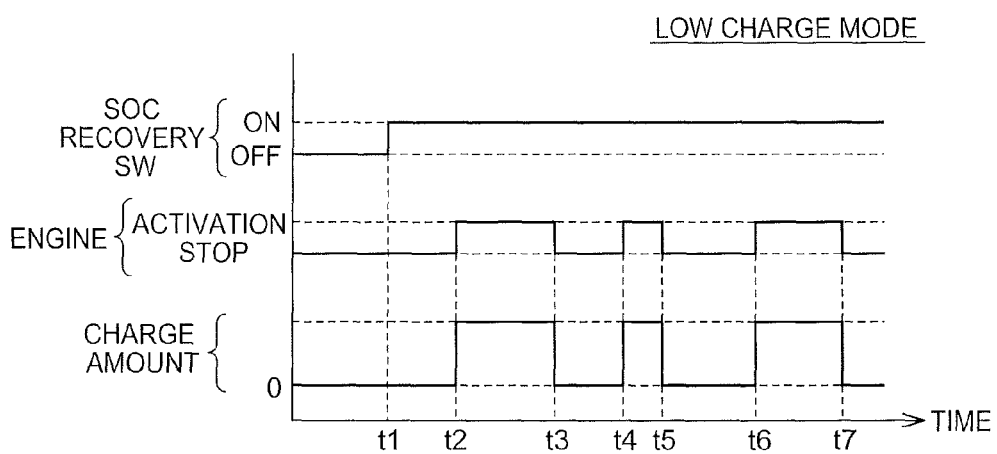
FIG. 5 is a timing chart showing charging operation in a low charge mode.

FIG. 5 is a timing chart showing charging operation in the low charge mode. With reference to FIG. 5, it is assumed that the low charge mode is selected by turning on the SOC recovery switch 28 at time t1. A travel load at this point is small, the engine 2 is stopped, and the engine 2 does not start immediately at this timing.

At time t2, when the engine 2 starts by the rising of the travel load, the motor generator 6 generates power by using the output of the engine 2, the power storage device 16 is charged with the predetermined charge amount such that the charging of the power storage device 16 is accelerated.

Also in normal time (in non-selection of the high charge mode/low charge mode) in which the SOC recovery switch 28 is in an OFF-state, the power storage device 16 is charged by using the engine 2 and the motor generator 6 in order to maintain the SOC. When the low charge mode is selected, the control target of the SOC is increased compared to a control target in normal time, or the charge rate of the power storage device 16 is increased compared to a charge rate in normal time.

At time t3, when the engine 2 stops by reduction in the travel load, the charging of the power storage device 16 is also stopped. Thus, in the low charge mode, a process of continuously activating the engine 2 to forcibly charge the power storage device 16 is not implemented, unlike the high charge mode. In the low charge mode, the charging of the power storage device 16 is stopped when the engine 2 stops with reduction in the travel load. That is, in the low charge mode, a period, during which the motor generator is stopped, at the time of a small travel load is increased in comparison with that at the time of a large travel load. Consequently, the recovery of the SOC in the low charge mode is slower than that in the high charge mode, but it is possible to avoid the lowering of the efficiency due to the charging at an operating point where the efficiency of the engine 2 is low, and to avoid NV deterioration caused by the activation of the engine 2 under the low travel load.

Figure 6:
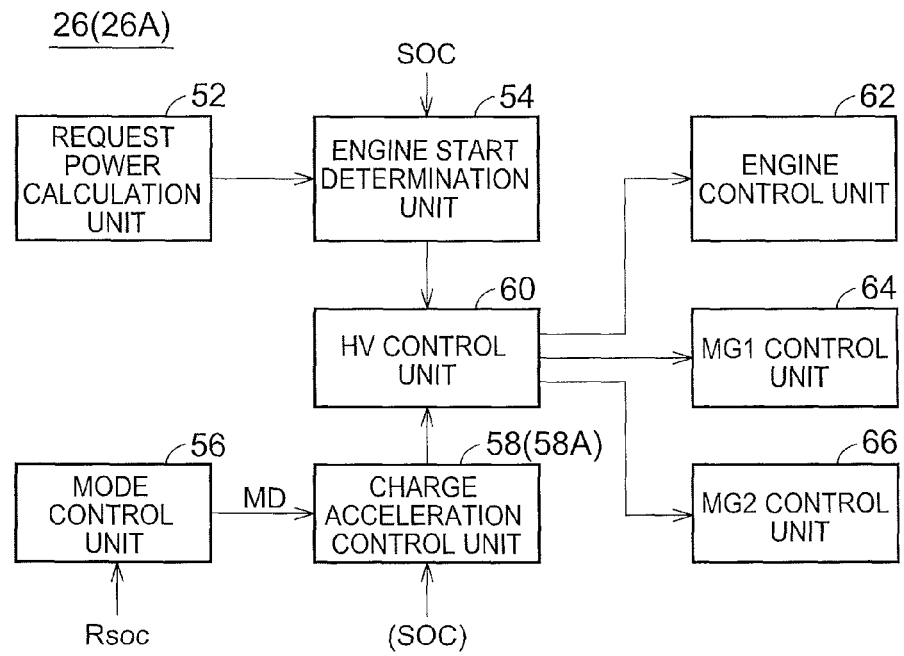
FIG. 6 is a block diagram functionally showing a configuration of an ECU shown in FIG. 1.

FIG. 6 is a block diagram functionally showing a configuration of the ECU 26 shown in FIG. 1. With reference to FIG. 6, the ECU 26 includes a request power calculation unit 52, an engine start determination unit 54, a mode control unit 56, a charge acceleration control unit 58, an HV control unit 60, an engine control unit 62, an MG1 control unit 64, and an MG2 control unit 66.

The request power calculation unit 52 calculates vehicle request power (hereinafter also referred to simply as "request power") necessary for obtaining driving force required by a driver, on the basis of an accelerator pedal operation amount, vehicle speed, and the like.

The engine start determination unit 54 determines on the basis of the request power calculated by the request power calculation unit 52, and a charging/discharging request amount of the power storage device 16 whether to start engine 2. Specifically, when a value obtained by adding the charging/discharging request amount (a charging side is a positive value) of the power storage device 16 to the request power is a predetermined engine start threshold value or more, the engine start determination unit 54 outputs an instruction to instruct the start of the engine 2 to the HV control unit 60. The charging/discharging request amount of the power storage device 16 is determined by the SOC. For example, when the SOC is low, the charging request amount is large. When the SOC is high, the discharging request amount is large.

The mode control unit 56 controls the charge mode (high charge mode, low charge mode, OFF state) on the basis of the request signal Rsoc received from the SOC recovery switch 28. Specifically, as shown in FIG. 3, the mode control unit 56 sequentially switches the high charge mode, the low charge mode, the OFF state, each time the request signal Rsoc from the SOC recovery switch 28 is received in accordance with the operation of the SOC recovery switch 28 by the user. Then, the mode control unit 56 generates a mode signal MD indicating a state of the charge mode (including the OFF state) to output the generated mode signal to the charge acceleration control unit 58 and outputs the state of the mode for display also to the SOC recovery switch 28.

When the mode signal MD from the mode control unit 56 indicates the high charge mode, the charge acceleration control unit 58 outputs, to the HV control unit 60, an instruction to start the engine 2 and forcibly charge the power storage device 16 by using the motor generator 6, regardless of a determination results of the engine start determination unit 54. When the mode signal MD from the mode control unit 56 indicates the low charge mode, the charge acceleration control unit 58 outputs, to the HV control unit 60, an instruction to accelerate the charging of the power storage device 16 by using the motor generator 6 when the engine start determination unit 54 instructs the start of the engine 2.

When the start of the engine 2 is instructed by the instruction from the engine start determination unit 54 or the charge acceleration control unit 58, the HV control unit 60 outputs, to the engine control unit 62, an instruction to activate the engine 2. The HV control unit 60 outputs, to the MG1 control unit 64, an instruction to instruct the power running driving of the motor generator 6 for cranking the engine 2, at the time of the start of the engine 2. Then, when the engine 2 starts, the HV control unit 60 outputs, to the MG1 control unit 64, an instruction to instruct the regenerative drive of the motor generator 6. Furthermore, the HV control unit 60 outputs, to the MG2 control unit 66, an instruction to instruct the driving of the motor generator 10.

When receiving the instruction to instruct the activation of the engine 2 from the HV control unit 60, the engine control unit 62 generates a control signal for activating the engine 2 to output the generated control signal to the engine 2. When receiving the instruction to instruct the driving of the motor generator 6 from the HV control unit 60, the MG1 control unit 64 generates a control signal for driving the power converter 18 to output the generated control signal to the power converter 18. When receiving the instruction to instruct the driving of the motor generator 10 from the HV control unit 60, the MG2 control unit 66 generates a control signal for driving the power converter 20 to output the generated control signal to the power converter 20.

As described above, according to this first embodiment, there is provided the SOC recovery switch 28 for the user to request the increase in the power storage amount of the power storage device 16. When the increase in the power storage amount is requested by the SOC recovery switch 28, the charging of the power storage device 16 is performed by the engine 2 and the motor generator 6 such that the charging of the power storage device 16 is accelerated (charge acceleration control). In the charge acceleration control, the high charge mode of increasing the power storage amount early, and the low charge mode of suppressing the charging of the power storage device 16 at the time of the small travel load in comparison with the charging of the power storage device 16 at the time of the large travel load are provided. In the low charge mode, the output of the engine 2 is also restricted when the travel load is small, and therefore the activation of the engine 2 with low efficiency and a low load that results in the deterioration of NV properties is suppressed. Therefore, according to this first embodiment, it is possible to provide a hybrid vehicle (HV) capable of living up to target efficiency or exhibiting NV properties in a case of increasing the power storage amount of the power storage device 16 in response to a request of the user.

A second embodiment will be now described. When a control target is set with respect to the SOC of a power storage device 16, and the SOC deviates from the control target in a direction in which the SOC is lower than the control target, an engine 2 starts and the power storage device 16 is forcibly charged by a motor generator 6 (forcible charging). This control target of the SOC of the power storage device 16 may have a tolerance range.

In this second embodiment, when a high charge mode is selected, the control target of the SOC is raised. Consequently, a state where the SOC deviates from the control target is creased, and as a result, the engine 2 starts and the power storage device 16 is forcibly charged by the motor generator 6.

A low charge mode is also a mode of requesting an increase in the power storage amount of the power storage device 16. However, similarly to a case of the high charge mode, when the control target of the SOC is rapidly raised with the selection of the low charge mode, the engine 2 starts and forcible charging is performed regardless of a travel load, and charging in a driving state where the efficiency of the engine 2 is low is also performed. According to this second embodiment, in the low charge mode, the control target is made to follow the SOC such that the SOC does not deviate from the control target. Consequently, the aforementioned forcible charging is prevented, and the charging of the power storage device 16 is performed when the engine 2 is actuated by the rising of the travel load.

Figure 7:
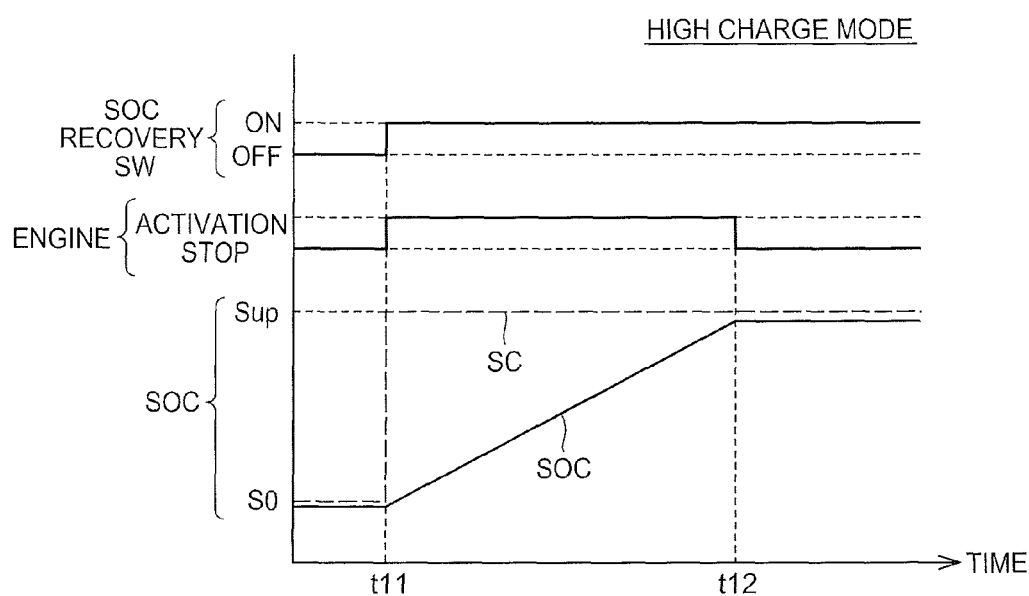
FIG. 7 is a timing chart showing an example of the motion of an SOC and a control target of the SOC at the time of the selection of a high charge mode.

FIG. 7 is a timing chart showing an example of the motion of an SOC and a control target of the SOC at the time of the selection of the high charge mode. With reference to FIG. 7, it is assumed that at time t11, a user operates an SOC recovery switch 2 whereby the high charge mode is selected. In the high charge mode, a control target SC of the SOC is raised from S0 in normal time to Sup at this timing. Consequently, a state where the SOC deviates from the control target SC is created, the engine 2 starts in accordance with this, and the power storage device 16 is charged by the motor generator 6. At time t12, when the SOC comes close to the control target SC, the engine 2 stops, and the charging of the power storage device 16 stops.

Figure 8:
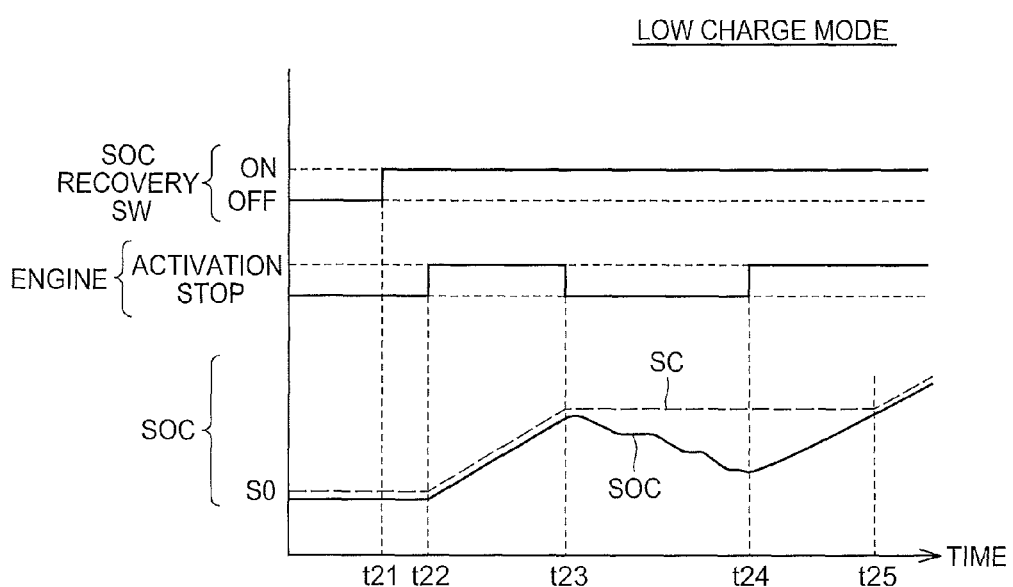
FIG. 8 is a timing chart showing an example of the motion of an SOC and a control target of the SOC at the time of the selection of a low charge mode.

FIG. 8 is a timing chart showing an example of the motion of an SOC and a control target of the SOC at the time of the selection of the low charge mode. With reference to FIG. 8, it is assumed that at time t21, the user operates the SOC recovery switch 28, whereby the low charge mode is selected. In the low charge mode, a control target SC of the SOC is not raised at this timing. Additionally, the engine 2 is stopped at time t21, and does not start immediately at this timing, and the charging of the power storage device 16 is not performed.

At time t22, when the engine 2 starts by the rising of the travel load, charge acceleration control of accelerating the charging of the power storage device 16 is performed. In the low charge mode, during the charging of the power storage device 16 by this charge acceleration control, the control target SC is made to follow the SOC. The control target SC may exhibit the same value as the SOC, or may be a value obtained by adding a predetermined margin to the SOC.

The control target SC is preferably made to follow a maximum value of SOC obtained since the SOC recovery switch 28 is turned on (the low charge mode is selected). That is, at time t23, when the engine 2 stops by reduction in the travel load, the charging of the power storage device 16 by the motor generator 6 also stops. Thereafter, while the SOC tends to lower in accordance with traveling, the control target SC is not made to follow the SOC at the time of the lowering of the SOC. When the engine 2 restarts by the rising of the travel load at time t24, and the SOC reaches the control target SC at time t25, the control target SC is made to follow the SOC in line with the subsequent rising of the SOC. Consequently, the control target SC can be prevented from lowering with the lowering of the SOC during the stop of the engine.

A configuration of the entire system of a hybrid vehicle (HV) according to this second embodiment is the same as that of the hybrid vehicle (HV) 100 according to the first embodiment shown in FIG. 1.

Referring to FIG. 6 again, an ECU 26A according to the second embodiment includes a charge acceleration control unit 58A in place of the charge acceleration control unit 58 in the configuration of the ECU 26 of the first embodiment. The charge acceleration control unit 58A receives a mode signal MD from a mode control unit 56, and further receives an SOC from the power storage device 16. Then, when the mode signal MD indicates non-selection of the high charge mode and the low charge mode (charge acceleration control OFF), the charge acceleration control unit 58A sets the control target SC of the SOC to S0 that is a normal value.

When the mode signal MD indicates the high charge mode, the charge acceleration control unit 58A raises the control target SC of the SOC from the normal value S0 to Sup (see FIG. 7). On the other hand, when the mode signal MD indicates the low charge mode, the charge acceleration control unit 58A makes the control target SC follow the maximum value of the SOC after the selection of the low charge mode (see FIG. 8).

When the SOC is deviates from the control target SC in a direction in which the SOC is lower than the control target SC, the charge acceleration control unit 58A outputs, to an HV control unit 60, an instruction to start the engine 2 and forcibly charge the power storage device 16 by using the motor generator 6. When the mode signal MD indicates the low charge mode, the charge acceleration control unit 58A outputs, to the HV control unit 60, an instruction to accelerate the charging of the power storage device 16 by using the motor generator 6 when the engine start determination unit 54 instructs the start of the engine 2.

Other configurations of the ECU 26A are the same as those of the ECU 26 of the first embodiment.

Figure 9:
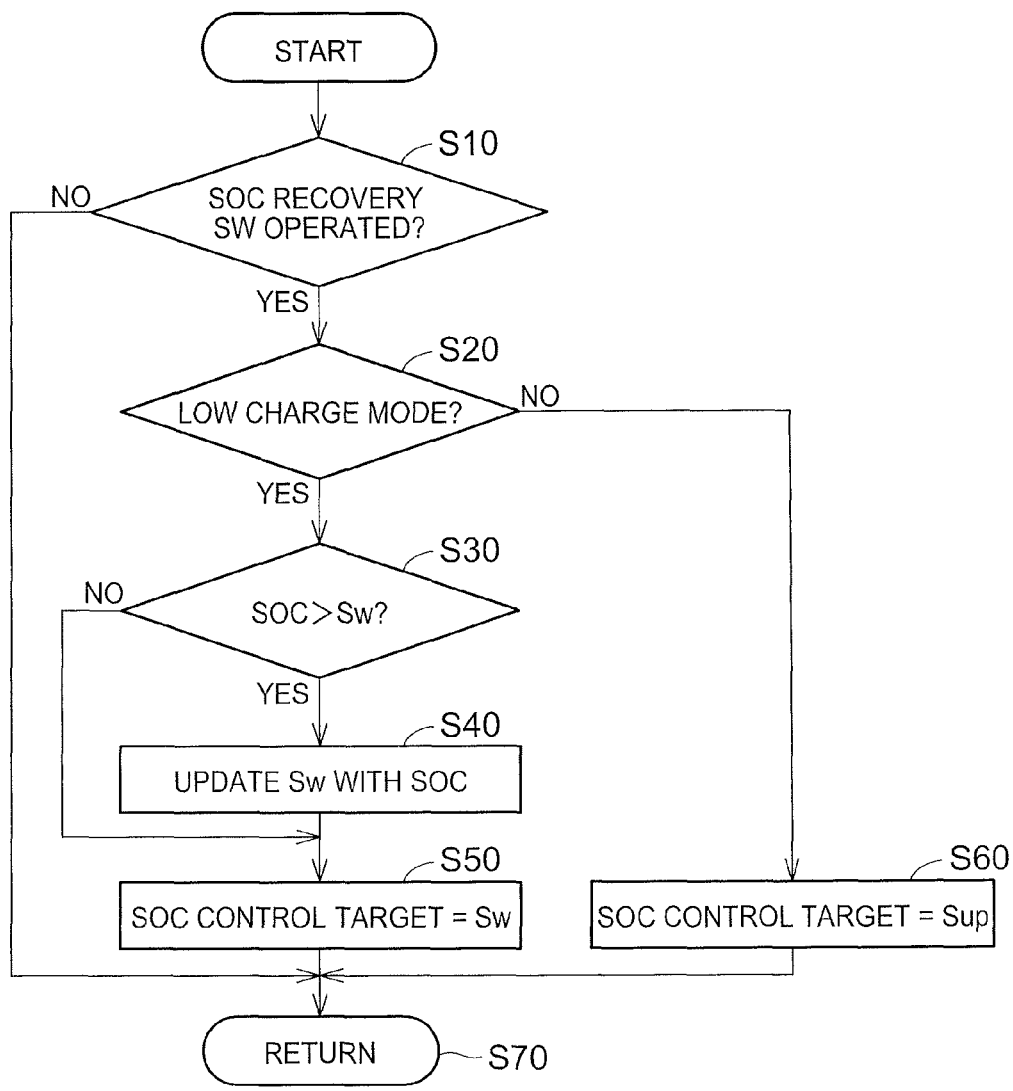
FIG. 9 is a flowchart for illustrating a setting procedure of the control target of the SOC in an ECU.

FIG. 9 is a flowchart for illustrating a setting procedure of the control target SC of the SOC in the ECU 26A. A previously stored program is called from main routine to be executed, thereby implementing this flowchart. Alternatively, processes in all of or a part of steps can be implemented by building dedicated hardware (electronic circuit).

With reference to FIG. 9, the ECU 26A determines whether or not the SOC recovery switch 28 is operated (Step S10). When determining that the SOC recovery switch 28 is operated (YES in Step S10), the ECU 26A determines whether or not the low charge mode is selected by the operation of the SOC recovery switch 28 (Step S20).

When determining that the charge mode is the low charge mode (YES in Step S20), the ECU 26A determines whether or not the SOC is larger than a work value Sw (Step S30). The work value Sw is temporary storage data for holding the maximum value of the SOC after the selection of the low charge mode. In Step S30, when determining that the SOC is larger than the work value Sw (YES in Step S30), the ECU 26A updates the work value Sw with the SOC received from the power storage device 16 at this time (Step S40). Then, the ECU 26A substitutes the work value Sw for the control target SC of the SOC (Step S50).

In Step S30, when determining that the SOC exhibits the work value Sw or less (NO in Step S30), the ECU 26A shifts a process to Step S50 without executing the process in Step S40. By the processes in Steps S30 and S50, the control target SC of the SOC can be made to follow the maximum value of the SOC (see FIG. 8).

On the other hand, in Step S20, when determining that the charge mode is not the low charge mode, namely, the charge mode is the high charge mode (NO in Step S20), the ECU 26A raises the control target SC of the SOC from S0 in the normal time (non-selection of the high charge mode/low charge mode) to Sup (Step S60).

In the aforementioned second embodiment, the control target SC of the SOC is made to follow the SOC in the low charge mode. However, in place of the SOC, the voltage of the power storage device 16 may be employed. That is, the SOC is correlated with the charging voltage of the power storage device 16, and therefore it is assumed that the voltage of the power storage device 16 is controlled with a control target, the control target of the voltage of the power storage device 16 may be made to follow the voltage of the power storage device 16 in the low charge mode.

In the aforementioned second embodiment, the control target of the SOC is increased at the time of the selection of the high charge mode/low charge mode. However, in place of the increase of the control target of the SOC, a charge rage of the power storage device 16 at the time of the selection of the charge mode may be made increased in comparison with a charge rate at the time of the non-selection of the charge mode.

As described above, in this second embodiment, the control target SC is made to follow the SOC when the low charge mode is selected such that the SOC does not deviates from the control target SC. Consequently, in the low charge mode, forcible charging caused by the deviation of the SOC from the control target SC is not performed, and the charging of the power storage device 16 is performed when the engine 2 is activated by the rising of the travel load. Therefore, according to this second embodiment, it is possible to obtain effects similar to those of the first embodiment, and implement the low charge mode with a simple configuration.

A third embodiment will be now described. As in the aforementioned first and second embodiments, when a value obtained by adding a charging/discharging request amount of a power storage device 16 to request power of a vehicle reaches a predetermined engine start threshold value or more, an engine 2 starts.

The charging/discharging request amount of the power storage device 16 is normally determined on the basis of difference ΔSOC between an SOC and a control target SC of the SOC (=SOC−control target SC). On the other hand, in this third embodiment, at the time of the selection of a low charge mode, the aforementioned charging/discharging request amount is set to a constant charge amount regardless of the SOC.

Figure 10:
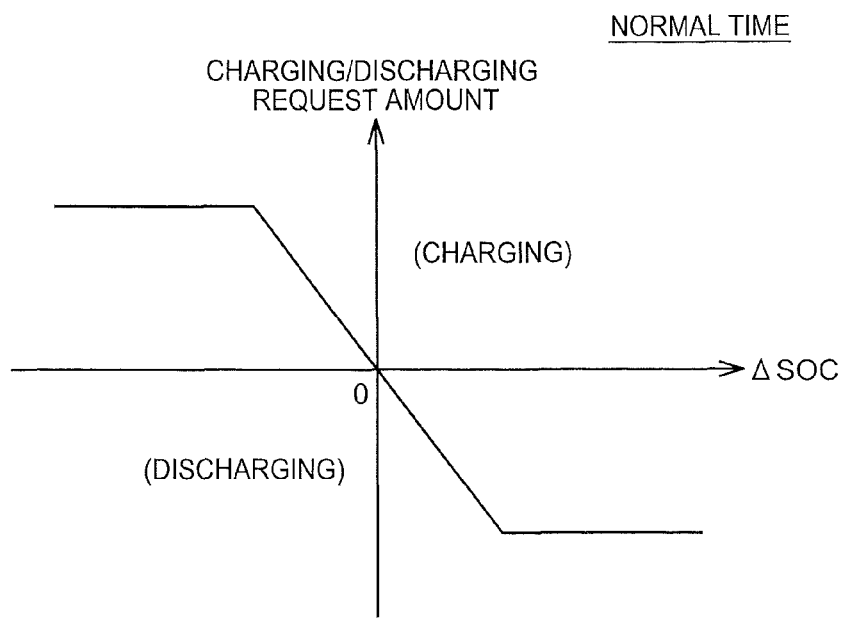
FIG. 10 is a diagram showing a charging/discharging request amount of a power storage device in normal time.

FIG. 10 is a diagram showing a charging/discharging request amount of the power storage device 16 in normal time. The normal time mentioned here means time other than time when the low charge mode is selected, described in FIG. 11. With reference to FIG. 10, the horizontal axis indicates the difference ΔSOC (=SOC−control target SC) between the SOC and the control target SC of the SOC, and the vertical axis indicates an charging/discharging request amount (a charging request amount is a positive value). In representative explanation for a charging side, when the value of ΔSOC is in a small range, the charging request amount is in proportion to the value of ΔSOC. When the value of ΔSOC becomes larger than a predetermined value, the charging request amount becomes constant (maximum value).

Figure 11:
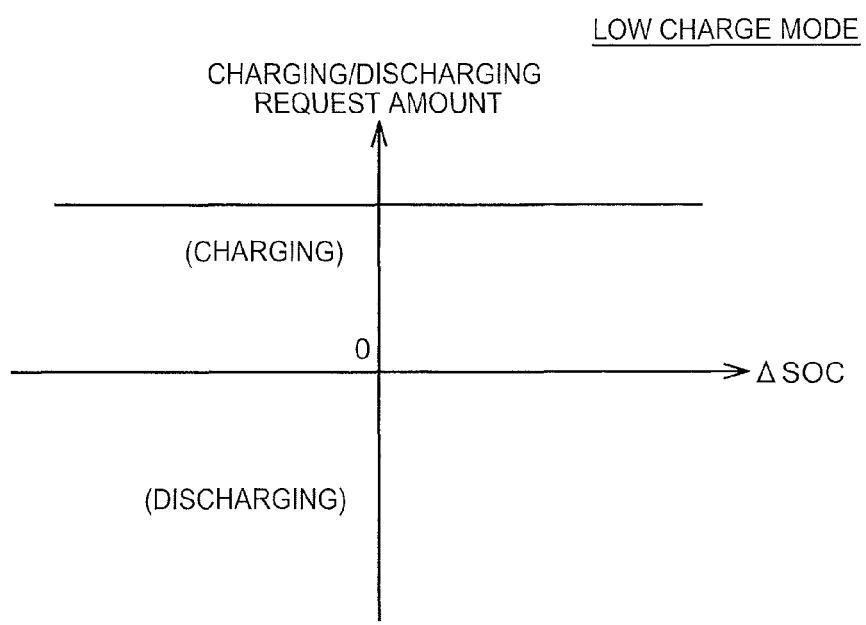
FIG. 11 is a diagram showing a charging/discharging request amount of the power storage device at the time of the selection of a low charge mode.

FIG. 11 is a diagram showing a charging/discharging request amount of the power storage device 16 at the time of the selection of the low charge mode. With reference to FIG. 11, at the time of the selection of the low charge mode, the charging/discharging request amount is a constant charge amount regardless of the SOC. In the low charge mode, while charge acceleration control is performed at the time of the activation of the engine 2, the charging/discharging request amount is changed in accordance the SOC as shown in FIG. 10, thereby resulting in a possibility that desired charging is not performed at the time of the activation of the engine 2 since the charging/discharging request amount varies depending on the SOC. Therefore, in this third embodiment, the charging/discharging request amount of the power storage device 16 is set to a constant charge amount in the low charge mode, regardless of the SOC, so that the start timing of the engine 2 according to a travel load is stabilized. Consequently, charging acceleration in the low charge mode is stably performed.

Figure 12:
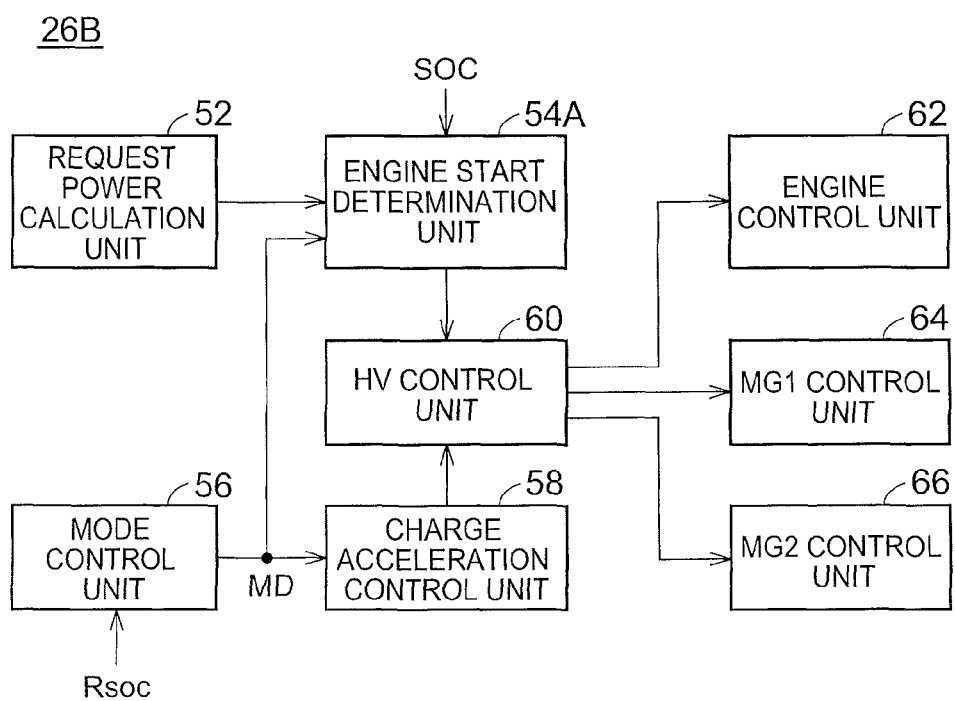
FIG. 12 is a block diagram functionally showing a configuration of an ECU according to a third embodiment.

FIG. 12 is a block diagram functionally showing a configuration of an electronic control unit (ECU) 26B according to the third embodiment. With reference to FIG. 12, the ECU 26B includes an engine start determination unit 54A in place of the engine start determination unit 54 in the ECU 26 of the first embodiment shown in FIG. 6.

The engine start determination unit 54A receives a mode signal MD from a mode control unit 56. When the mode signal MD indicates a mode other than the low charge mode, the engine start determination unit 54A performs the start determination of the engine 2 by using the charging/discharging request amount obtained from a map (function expression may be employed) of the charging/discharging request amount shown in FIG. 10. On the other hand, when the mode signal MD indicates the low charge mode, the engine start determination unit 54A performs the start determination of the engine 2 by using the charging/discharging request amount that is a constant charge amount regardless of the SOC.

Other configurations of the ECU 26B are the same as those of the ECU 26 of the first embodiment.

Figure 13:
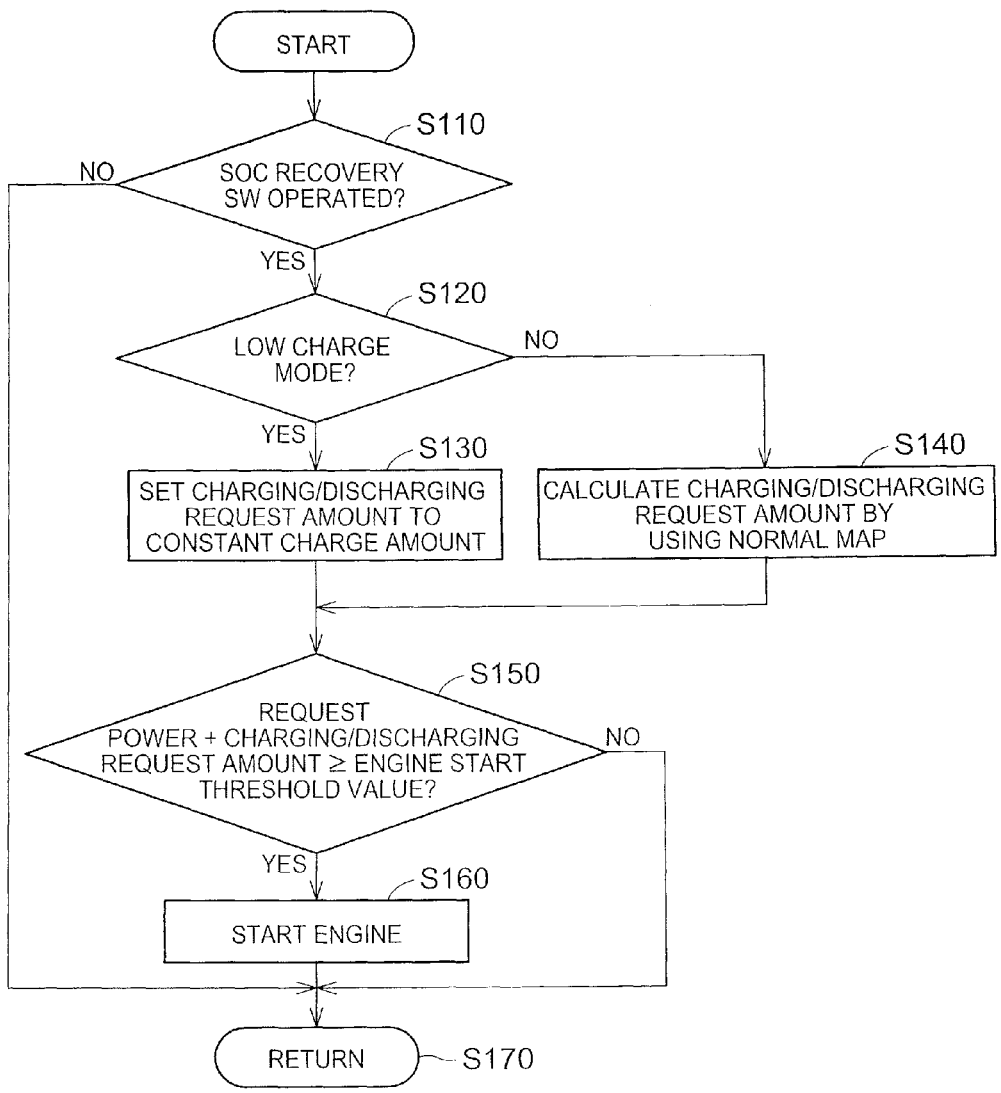
FIG. 13 is a flowchart for illustrating a setting procedure of engine start determination in the ECU.

FIG. 13 is a flowchart for illustrating a setting procedure of engine start determination in the ECU 26B. A previously stored program is called from main routine to be executed, thereby implementing this flowchart as well. Alternatively, processes in all of or a part of steps can be implemented by building dedicated hardware (electronic circuit).

With reference to FIG. 13, the ECU 26B determines whether or not an SOC recovery switch 28 is operated (Step S110). When determining that the SOC recovery switch 28 is operated (YES in Step S110), the ECU 26B determines whether or not the low charge mode is selected by the operation of the SOC recovery switch 28 (Step S120).

When determining that the charge mode is the low charge mode (YES in Step S120), the ECU 26B sets the charging/discharging request amount of the power storage device 16 to a constant charge amount (Step S130). In Step S120, when determining that the charge mode is not the low charge mode (NO in Step S120), the ECU 26B calculates a charging/discharging request amount by using the map (normal map) show in FIG. 10 (Step S140).

The ECU 26B determines whether or not a value obtained by adding the charging/discharging request amount determined in Step S130 or S140 to request power is a predetermined engine start threshold value or more (Step S150). Then, when determining that the value obtained by adding the charging/discharging request amount to the request power is the engine start threshold value or more (YES in Step S150), the ECU 26B starts the engine 2 (Step S160). When determining that the value obtained by adding the charging/discharging request amount to the request power is smaller than the engine start threshold value (NO in Step S150), the ECU 26B shifts a process to Step S170 without executing the process in Step S160.

As described above, according to this third embodiment, in the low charge mode, the charging/discharging request amount of the power storage device 16 is set to the constant charge amount regardless of the SOC, thereby stabilizing the start timing of the engine 2 according to the travel load. Therefore, according to this third embodiment, it is possible to obtain effects similar to those of the first embodiment, and stably accelerate the charging of the power storage device 16 in the low charge mode.

In each of the aforementioned embodiments, the two charge modes (high charge mode/low charge mode) are selectable by the operation of the SOC recovery switch 28. However, a configuration in which the function of the high charge mode is not provided may be employed. That is, when the SOC recovery switch 28 is turned on, while the charge acceleration control of accelerating the charging of the power storage device 16 is performed, the charging of the power storage device 16 at the time of a small travel load may be suppressed in comparison with the charging of the power storage device 16 at the time of a large travel load. As an example, as in the selection of the low charge mode, the engine 2 and the power converter 18 are controlled such that the SOC is increased when the engine 2 is activated in accordance with the travel load. That is, while the state of stopping the engine 2 at the time of the small travel load is increased compared to the state of stopping the engine 2 at the time of the large travel load, the charge acceleration control is performed when the engine 2 is activated in accordance with the travel load. With such a configuration, the activation of the engine 2 with low efficiency and a low load that results in the deterioration of NV properties is suppressed, and therefore it is possible to provide a HV capable of living up to target efficiency or exhibiting NV properties in a case of increasing the power storage amount of the power storage device 16 in response to a request of a user.

In each of the aforementioned embodiments, the HV 100 is a series/parallel type vehicle capable of dividing the power of the engine 2 by the power division apparatus 4 to transmit the divided power to the driving shaft 12 and the motor generator 6. However, this invention is applicable to other type s of HVs. For example, this invention is applicable to a so-called series type HV that uses the engine 2 only for the purpose of the driving of the motor generator 6, and generates the driving force of the vehicle only by the motor generator 10, a HV that recovers only regenerative energy in kinetic energy generated by an engine as electrical energy, a motor assist HV in which an engine serves as main power, and a motor assists when needed, or the like.

In the aforementioned description, the engine 2 corresponds to an embodiment of an "internal combustion engine" in this invention. The motor generator 6 corresponds to an embodiment of a "power generation apparatus" in this invention. The ECUs 26, 26A and 26B correspond to an embodiment of a "control apparatus" in this invention. The SOC recovery switch 28 corresponds to an embodiment of an "input apparatus" in this invention.

It should be understood that the embodiments disclosed herein are illustrative and non-restrictive in every respect. The scope of the invention is defined by the terms of the claims, rather than the description above, and is intended to include any modifications within the scope and meaning equivalent to the terms of the claims.

What is claimed is:
1. A hybrid vehicle comprising:
a power storage device;
an internal combustion engine;

a power generation apparatus configured to generate charging power of the power storage device by using output of the internal combustion engine;

an input apparatus configured to request, by a user input, an increase in a power storage amount of the power storage device; and an electronic control unit configured to:

(a) control charging of the power storage device by the power generation apparatus and accelerate the charging of the power storage device, when the increase in the power storage amount is requested, and (b) suppress charging of the power storage device at the time when a travel load of the internal combustion engine is small in comparison with charging of the power storage device at the time when the travel load of the internal combustion engine is large, when the increase in the power storage amount is requested.

2. The hybrid vehicle according to claim 1, wherein the electronic control unit is configured to increase a period, during which the power generation apparatus is stopped, at the time when the travel load of the internal combustion engine is small in comparison with a period, during which the power generation apparatus is stopped, at the time when the travel load of the internal combustion engine is large, when the increase in the power storage amount is requested.

3. The hybrid vehicle according to claim 1, wherein the electronic control unit is configured to execute control of accelerating the charging of the power storage device by the power generation apparatus, when the increase in the power storage amount is requested, and the electronic control unit is configured to control switching between a high charge mode of increasing the power storage amount early, and a low charge mode of suppressing the charging of the power storage device by the power generation apparatus at the time when the travel load is small in comparison with the charging of the power storage device by the power generation apparatus at the time when the travel load is large, when the control of accelerating the charging is executed.

4. The hybrid vehicle according to claim 3, wherein the electronic control unit is configured to forcibly perform the charging of the power storage device by the power generation apparatus, when a state amount indicating a charging state of the power storage device deviates from a target of the state amount in a direction in which the state amount is lower than the target, and make the target follow the state amount at the time of the charging of the power storage device by the power generation apparatus such that the state amount does not deviate from the target, when the low charge mode is selected.

5. The hybrid vehicle according to claim 4, wherein the electronic control unit is configured to make the target follow a maximum value of the state amount, when the low charge mode is selected.

6. The hybrid vehicle according to claim 4, wherein the electronic control unit is configured to increase the target such that the state amount deviates from the target, when the high charge mode is selected.

7. The hybrid vehicle according to claim 3, wherein the electronic control unit is configured to make a charge amount of the power storage device by the power generation apparatus constant, regardless of the power storage amount, when the low charge mode is selected.

8. The hybrid vehicle according to claim 3, wherein the electronic control unit is configured to start the internal combustion engine when the travel load is increased, and stop the internal combustion engine when the travel load is reduced, and perform the charging of the power storage device by the power generation apparatus at the time of actuation of the internal combustion engine according to the travel load, when the low charge mode is selected.

9. The hybrid vehicle according to claim 3, wherein the electronic control unit is configured to perform switching between the high charge mode and the low charge mode on the basis of input from the input apparatus.

10. The hybrid vehicle according to claim 1, wherein the electronic control unit is configured to increase a charging target of the power storage device by the power generation apparatus, when the increase in the power storage amount is requested.

11. The hybrid vehicle according to claim 1, wherein the electronic control unit is configured to control the charging of the power storage device by the power generation apparatus so as to increase a charge rate of the power storage device by the power generation apparatus, when the increase in the power storage amount is requested.

12. A control method of a hybrid vehicle, the hybrid vehicle including a power storage device, an internal combustion engine, a power generation apparatus, and an input apparatus configured to request an increase in a power storage amount of the power storage device by a user input, the control method comprising:

charging the power storage device by the power generation apparatus and accelerating the charging of the power storage device, when the input apparatus requests the increase in the power storage amount; and suppressing charging of the power storage device at the time when a travel load of the internal combustion engine is small in comparison with charging of the power storage device at the time when the travel load is large, in a state where the input apparatus requests the increase in the power storage amount.

13. A hybrid vehicle comprising:

a power storage device;

an internal combustion engine;

a power generation apparatus configured to generate charging power of the power storage device by using output of the internal combustion engine;

an input apparatus configured to request, by a user input, an increase in a power storage amount of the power storage device; and an electronic control unit configured to:

(a) control charging of the power storage device by the power generation apparatus and accelerate the charging of the power storage device, when the increase in the power storage amount is requested, and (b) suppress charging of the power storage device at the time when a travel load of the hybrid vehicle is small in comparison with charging of the power storage device at the time when the travel load of the hybrid vehicle is large, when the increase in the power storage amount is requested.

* * * * *